(12) United States Patent
Kambhampati et al.

(10) Patent No.: US 8,904,522 B1
(45) Date of Patent: Dec. 2, 2014

(54) UNIVERSAL COMMUNICATIONS GATEWAY

(75) Inventors: Raja Kambhampati, Murphy, TX (US);
Ian P. Difranco, Rowlett, TX (US);
Haluk Sasmazer, West Liberty, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 264 days.

(21) Appl. No.: 12/884,071

(22) Filed: Sep. 16, 2010

(51) Int. Cl.
*H04L 29/06* (2006.01)

(52) U.S. Cl.
USPC .......................................... 726/22

(58) Field of Classification Search
USPC ................................... 726/22–25
See application file for complete search history.

(56) References Cited

U.S. PATENT DOCUMENTS

| | | | | |
|---|---|---|---|---|
| 6,272,640 | B1* | 8/2001 | Sokol | 726/23 |
| 6,990,591 | B1* | 1/2006 | Pearson | 726/22 |
| 6,993,552 | B2* | 1/2006 | Jacobs et al. | 709/200 |
| 8,184,550 | B2* | 5/2012 | Beck et al. | 370/252 |
| 2005/0125754 | A1* | 6/2005 | Schubert et al. | 716/5 |
| 2006/0272019 | A1* | 11/2006 | Addepalli | 726/23 |
| 2010/0162392 | A1* | 6/2010 | Jeong et al. | 726/22 |
| 2010/0283666 | A1* | 11/2010 | Lee et al. | 342/175 |

* cited by examiner

*Primary Examiner* — David Le
(74) *Attorney, Agent, or Firm* — Angel N. Gerdzhikov; Donna P. Suchy; Daniel M. Barbieri

(57) ABSTRACT

The disclosure relates to a classification system which includes a classification circuit which may determine a classification of a signal based on comparing signal data received via a sensor to data in a database. The classification circuit may determine an interface protocol based on the classification.

20 Claims, 9 Drawing Sheets

UNIVERSAL COMMUNICATIONS GATEWAY

BACKGROUND

The present disclosure relates generally to the field of electronic communication networks. More specifically, the disclosure relates to systems and methods utilized to provide dynamic spectrum allocation and classifications of waveforms.

The modern military is heavily dependent on multiple devices to address specific problems. Radios are an important subset of these devices and are widely used to provide voice, data and video communications among and within various groups in the theater. These radios support specific waveforms (i.e., different radios and form factors for WNW, SRW, L-16, etc.). This may inhibit troops from carrying different radios to communicate and coordinate among themselves. Presently, military communication systems may not be able to communicate with other military communication systems from different countries or commercial communication systems. These systems may not be able to determine whether another system is an ally or a foe which can cause poor decisions to be made. A flexible communication gateway that supports interoperability which can automatically translate among a set of waveforms to transfer information across networks would enhance these field operations.

Thus, there is a need for systems and methods to bridge the communications process between these various systems. This disclosure provides systems and methods which can create communication bridges between dissimilar radio systems to enhance the communication and decision making process.

SUMMARY

One embodiment of the disclosure relates to a classification system including a classification circuit which may determine a classification of a signal based on comparing signal data received via a sensor to data in a database. The classification circuit may determine an interface protocol based on the classification.

Another embodiment of the disclosure relates to a method for communications. The method includes receiving signal data and comparing the signal data to data in a database. The method also includes determining a classification of a signal based on a comparison of the signal data to data in the database and determining an interface protocol based on the classification.

Yet, another embodiment of the disclosure relates to a system including means for receiving signal data and means for comparing the signal data to data in a database. The system further includes means for determining a classification of a signal based on a comparison of the signal data to data in the database and means for determining an interface protocol based on the classification.

DETAILED DESCRIPTION OF THE EXEMPLARY EMBODIMENTS

Figure 1:
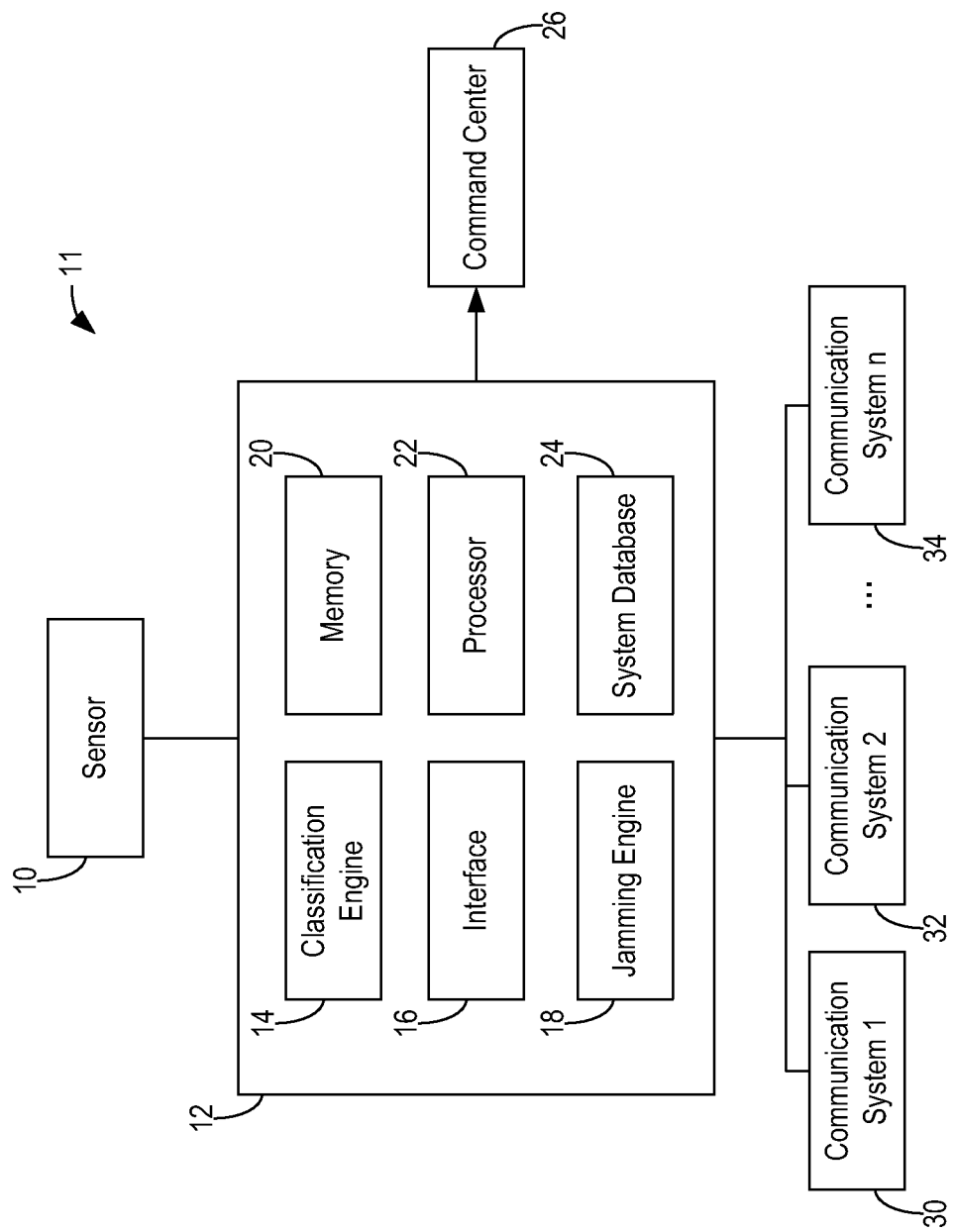
FIG. 1 is a block diagram of a communication system, according to an exemplary embodiment.

Referring to FIG. 1, a block diagram of a communication system 11 is shown, according to an exemplary embodiment. Communication system 11 may include a sensor 10, a gateway module 12, a command center 26, a first communication system 30, a second communication system 32, and an nth communication system 34. Gateway module 12 may include a classification engine 14, an interface 16, a jamming engine 18, a memory 20, a processor 22, and a system database 24. Sensor 10 may be any sensor that can receive data from another source.

In an exemplary embodiment, sensor 10 may receive signal data from various sources (e.g., first communication system 30, second communication system 32, and nth communication system 34). Classification engine 14 may utilize memory 20 and processor 22 to compare these received signal data to data in database 24. Classification engine 14 may categorize or identify the source from which the received signal data was sent and determine various characteristics of the source (e.g., friend, foe, technology, location, transmitting power size, equipment utilized, encryption capabilities, language, etc.). For example, based on the waveform utilized by the source a determination may be made that the source is an ally or a foe. Further, based on the characteristics of the waveform, the technology, equipment, or encryption utilized may be determined. Location data and transmitter size may also be determined by the power signal and location determining algorithms.

Classification engine 14 may determine various protocols to be utilized with first communication system 30, second communication system 32, and nth communication system 34 based on identifying the source (or characteristics of the waveform) of the data signals emitted from first communication system 30, second communication system 32, and nth communication system 34.

In an exemplary embodiment, gateway module 12 may utilize interface 16 to employ these various protocols to enable communications between gateway module 12 and first communication system 30, second communication system 32, and/or nth communication system 34. In another exemplary embodiment, gateway module 12 may utilize jamming engine 18 to transmit a jamming signal to first communication system 30, second communication system 32, and/or nth communication system 34. Jamming signal may be based on a determination that the communication system is a foe or a potential threat (e.g., bomb, smart weapon, etc.).

In another exemplary embodiment, gateway module 12 may generate a message relating to first communication system 30, second communication system 32, and/or nth communication system 34. This message may be transmitted to command center 26. For example, the message may be that the communication system is a threat. Further, the message may indicate that a course of action should be taken.

Figure 2:
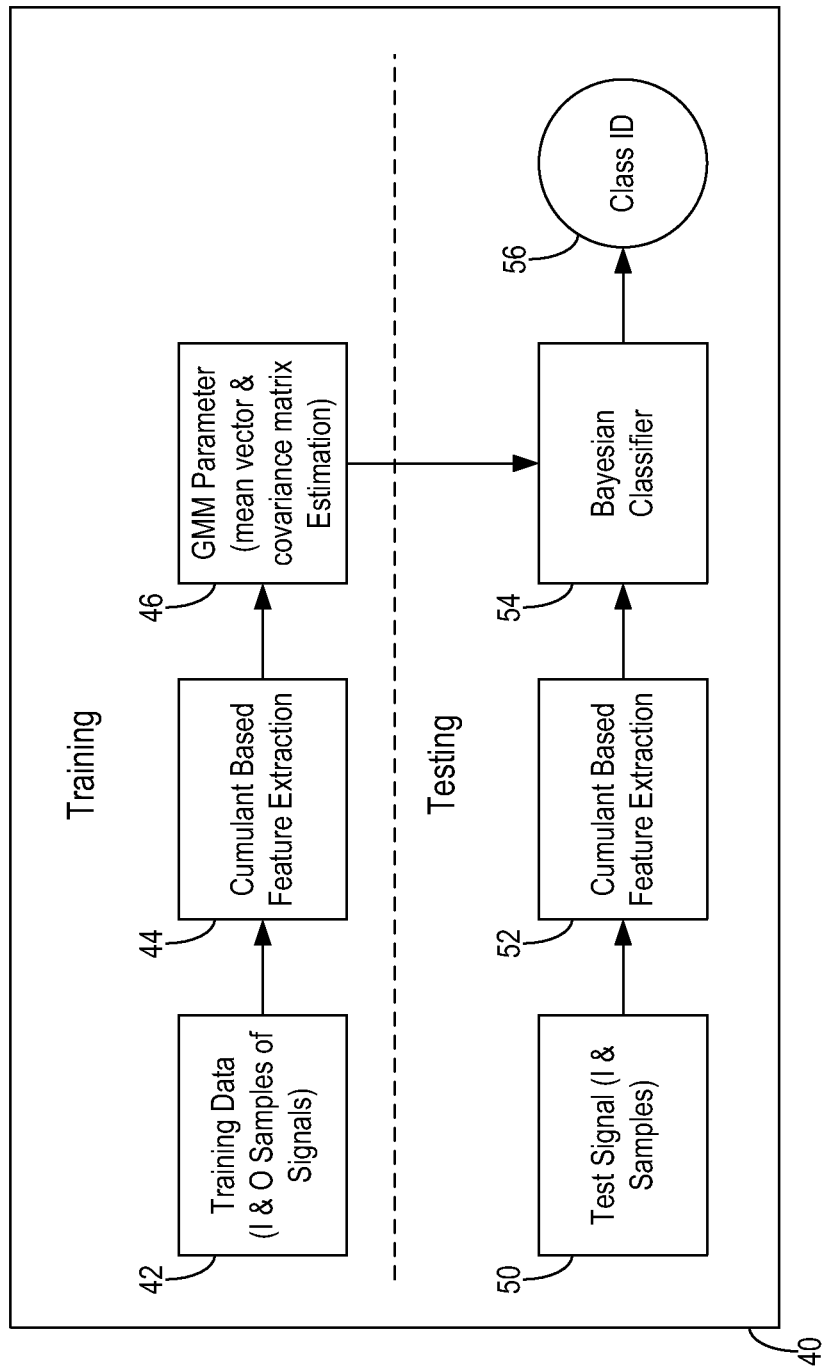
FIG. 2 is a training and testing flowchart, according to an exemplary embodiment.

In FIG. 2, a training and testing flowchart 40 is shown, according to an exemplary embodiment. In an exemplary embodiment, classification engine 14 may host algorithms for training procedures, identification procedures, and classification procedures. In an exemplary embodiment, classification engine 14 may be trained by utilizing input and output samples of signals (step 42). The system then may utilize a cumulant based feature extraction algorithm (step 44). The system may then determine Gaussian Mixture Model ("GMM") parameters which may include mean vector and covariance matrix estimation (step 46). In an exemplary embodiment, the classification engine 14 may be tested by testing the signal sample (step 50). The system then may utilize a cumulant based feature extraction algorithm on the sample (step 52). The output from step 46 may be combined with the output from step 52 and a bayesian classifier may be utilized (step 54). The system may determine a classification identification (step 56).

In another exemplary embodiment, classification engine 14 may be trained on a radio frequency signal. Classification engine 14 may store unique statistical features regarding signals along with additional class data for later identification. Once classification engine 14 has created a library of classes (e.g., waveforms) in the testing mode, classification engine 14 may extract unique features from the sensor input, analyze the data, and identify classes that statistically match. In addition, classification engine 14 may create new classes for unknown radio frequency signals it has found or store new classes that were determined by other Classifier Engines and add them to a library of waveform classes.

Figure 3:
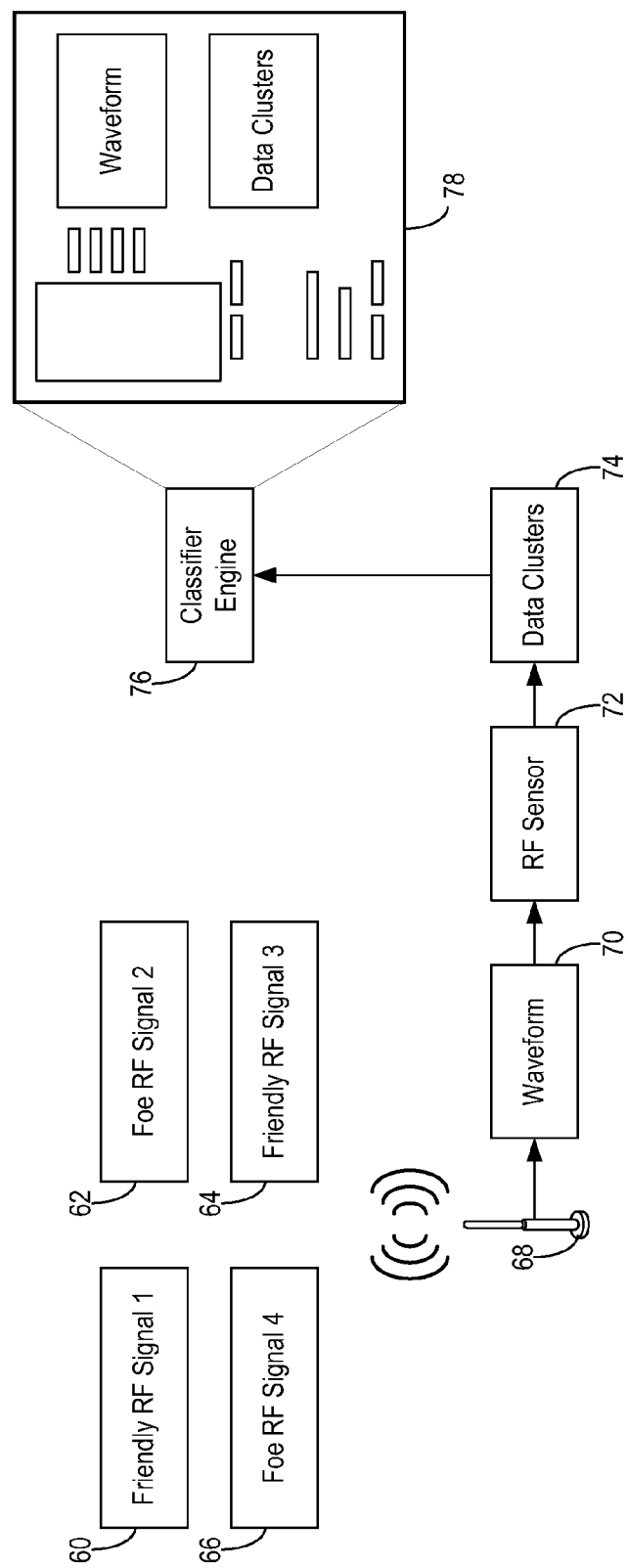
FIG. 3 is an illustration of a classifier engine, according to an exemplary embodiment.

In FIG. 3, an illustration of a classifier engine is shown, according to an exemplary embodiment. In an exemplary embodiment, a receiver 68 may receive data from a first signal 60, a second signal 62, a third signal 64, and a fourth signal 66. First signal 60 and third signal 64 may be ally signals and second signal 62 and fourth signal 66 may be foe signals. Receiver 68 may transmit waveform 70 to a radio frequency sensor 72. Radio frequency sensor 72 may transmit a data cluster 74 to a classifier engine 76. Classifier engine 76 may classify the signal based on waveform data and the data clusters depicted in a window 78.

In another exemplary embodiment, classifier engine 76 may interpret I and Q data from any radio frequency scanner. Classifier engine 76 may be able to support any frequency range. Classifier Engine 76 may utilize statistical measures to analyze the spectrum and identify and extract unique features of the radio frequency signal. For each signal, classifier engine 76 has been trained or tested on, classifier engine 76 may provide real-time characteristics such as modulation type, center frequency, and bandwidth. Classifier engine 76 may be different than traditional time-consuming demodulating signal recognition methods because classifier engine 76 utilizes these statistical measures to analyze the spectrum and identify and extract unique features of the radio frequency signal.

Classes for unknown radio frequency signals may be determined by clustering the statistical data and finding natural groupings in the extracted feature vector set. As new samples of an unknown waveform are received, the extracted features may be clustered together. If the extracted features do not have similar characteristics to features in existing classes, then the clustering can yield new classes and are assigned new class identifications.

In an exemplary embodiment, classifier engine 76 may encounter a waveform that does not appear to match any of the known waveforms. The signal source for this waveform may be utilizing a frequency hopping technique to disguise the waveform's characteristics. Classifier engine 76 may map the waveform and utilize a band shifting technique to find the actual signal pattern. Based on this shifted waveform, classifier engine 76 may be able to identify the waveform as a waveform assigned to an existing class identification.

Figure 4:
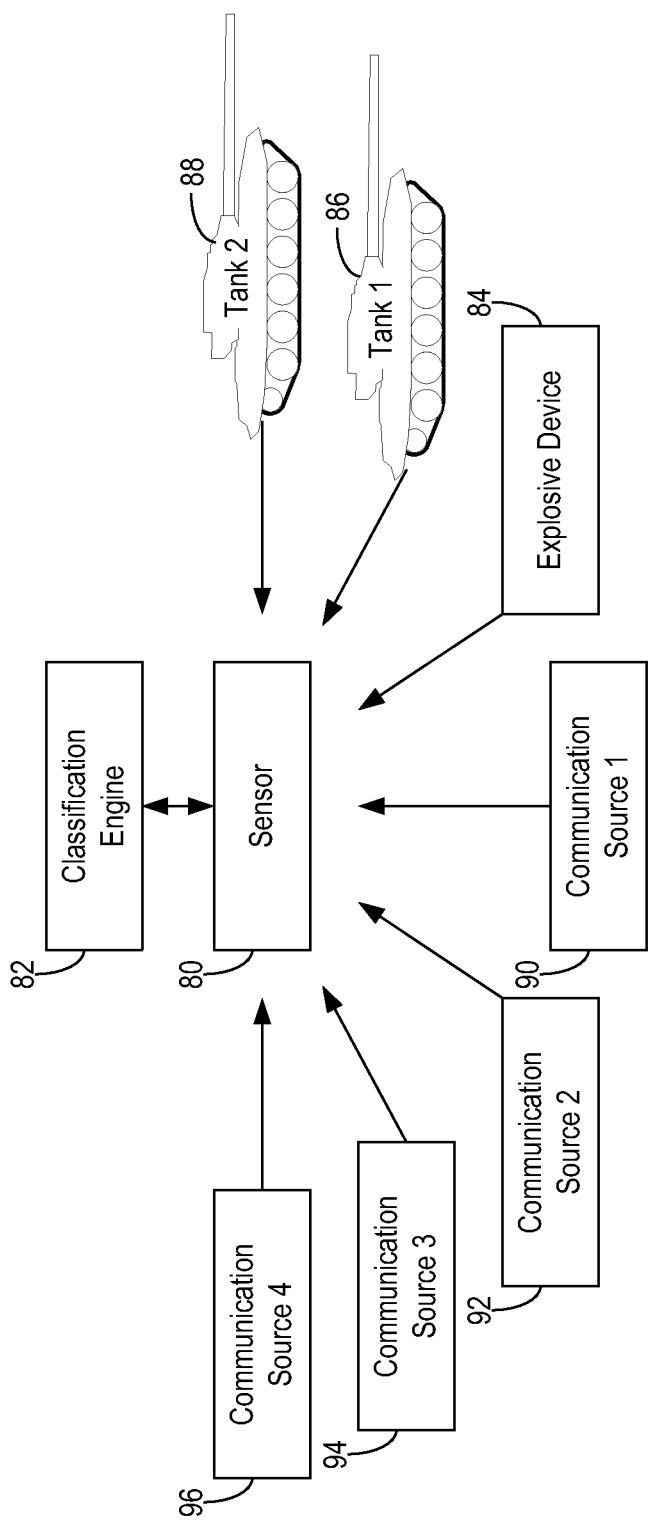
FIG. 4 is an illustration of a classification engine sensor, according to an exemplary embodiment.

In FIG. 4, an illustration of a classification engine sensor is shown, according to an exemplary embodiment. In an exemplary embodiment, a classification engine 82 may receive data from a sensor 80. Classification engine 82 may control sensor 80. For example, classification engine 82 may control the position of sensor 80, the directional position of sensor 80, the power supplied to sensor 80, or any other characteristic of sensor 80.

In an exemplary embodiment, sensor 80 may receive data from an explosive device 84, a first vehicle 86, a second vehicle 88, a first communication device 90, a second communication device 92, a third communication device 94, and/or a fourth communication device 96. Classification engine 82 may receive this data via sensor 80. In an exemplary embodiment, classification engine 82 may determine that explosive device 84 is from a hostile source based on classifying the waveform emitted from the source or explosive device 84. Classification engine 82 may transmit a jamming signal that may disable explosive device 84. In another exemplary embodiment, classification engine 82 may transmit an evacuation message to at least one building near explosive device 84. In another exemplary embodiment, classification engine 82 may transmit a threat message to a command center or another source (e.g., buildings in the area, government, etc.). In another exemplary embodiment, classification engine 82 may transmit a command related to explosive device 84, such as, sending out the bomb disablement unit, police, army, etc. In another exemplary embodiment, classification engine 82 may transmit a signal to the source of explosive device 84 that indicates that explosive device 84 has exploded.

In an exemplary embodiment, classification engine 82 may determine that first vehicle 86 is an ally vehicle and that second vehicle 88 is an enemy vehicle based on the characteristics of their respective waveforms. Classification engine 82 may determine various characteristics of first vehicle 86 and second vehicle 88. For example, the locations of the vehicles may be determined based on various location finding algorithms. In another example, the type of vehicle (e.g., XYZ tank, ABC tank, fueling truck, airplane, etc.) may be determined based on the waveform utilized, the messages transmitted, the speed of the vehicle, location of the vehicle, country, any other characteristic, or any combination thereof. In an exemplary embodiment, classification engine 82 may transmit the location of second vehicle 88 to first vehicle 86. In addition, classification engine 82 may transmit any other characteristic (e.g., speed, vehicle type, country) of second vehicle 88 to first vehicle 86.

In another exemplary embodiment, classification engine 82 may determine that first communication device 90 is a foe and transmit a jamming signal to first communication device 90. Classification engine 82 may determine that second communication device 92 and third communication device 94 are allies which utilizes two different protocols. Classification engine 82 may determine the interfaces needed to communicate with second communication device 92 and third communication device 94. In addition, classification engine 82 may be utilized as a communication bridge to allow second communication device 92 and third communication device 94 to communicate with each other. In an exemplary embodiment, classification engine 82 may determine that fourth communication device 96 is utilizing an unknown waveform and generate a new classification for this waveform.

In exemplary embodiments, classification engine 82 may upload intelligence information and trigger a counter-measures system either locally or remotely. In another exemplary embodiment, multiple classification engines 82 may be utilized with multiple radio frequency scanners and antennas to improve the response times in identifying and classifying analog and digital radar signals. In an exemplary embodiment, an open architecture may be utilized so that a receiver-agnostic, DSP-based system may be employed.

Figure 5:
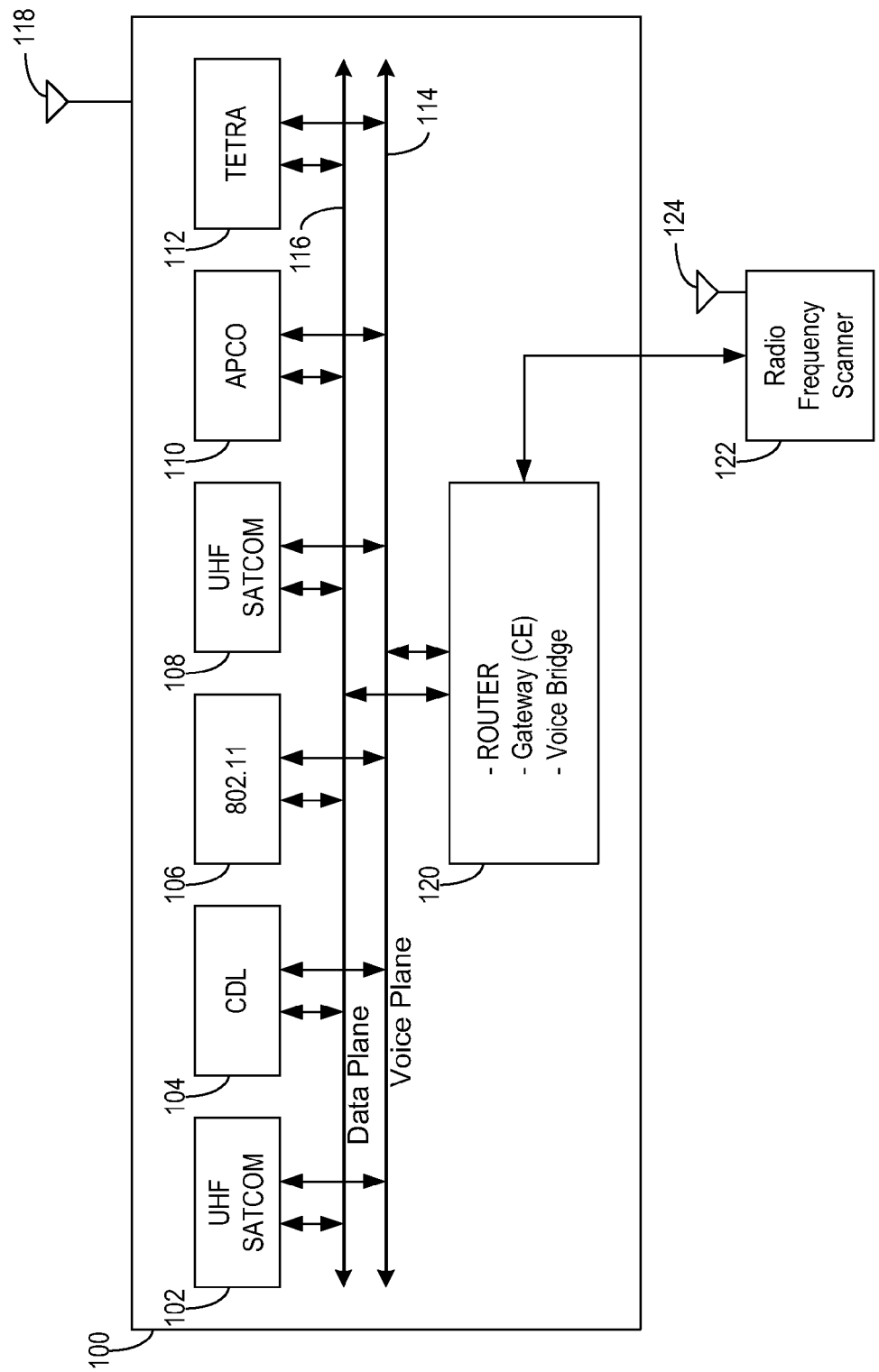
FIG. 5 is an illustration of a communication system, according to an exemplary embodiment.

In FIG. 5, an illustration of a communication system is shown, according to an exemplary embodiment. In an exemplary embodiment, a communication system 100 may include a first ultra high frequency satellite communication system ("UHF SATCOM") 102, a common data link 104, a 802.11 protocol device 106, a second UHF SATCOM 108, an APCO 110, a TETRA 112, a data plane 116, a voice plane 114, a first antenna 118, a router 120, a radio frequency scanner 122, and a second antenna 124.

The system may include a component translator. The component translator may include waveform modulation and demodulation functionality which may provide translation between different waveforms. The component translator may trigger the source waveform on the multi-channel Software Define Radio ("SDR") to instantiate the identified waveform and may also trigger the target waveforms on different channels of the same or different SDR which allows the system to be a plug-and-play solution for inter-waveform communication.

In an exemplary embodiment, classification engine 82 may interface with a high-speed, low-power, small form factor broadband spectrum power sensor. The sensor may continuously scan frequencies. In an exemplary embodiment, classification engine 82 may utilize wide band, low power, high speed radio frequency spectral sensor(s), which may be capable of monitoring and detecting signals by means of staring or scanning of the radio spectrum at high speeds. In an exemplary embodiment, the spectral sensor may be one of the multi-channel SDR on a scan mode of operation. The sensor may output time domain samples (I and Q) with an instantaneous bandwidth for processing by classification engine 82. Classification engine 82 may utilize an Ethernet as the communication interface for control and data handling. Router, Gateway and Voice bridge functionality may be hosted on one of the GPPs on the SDR.

Figure 6:
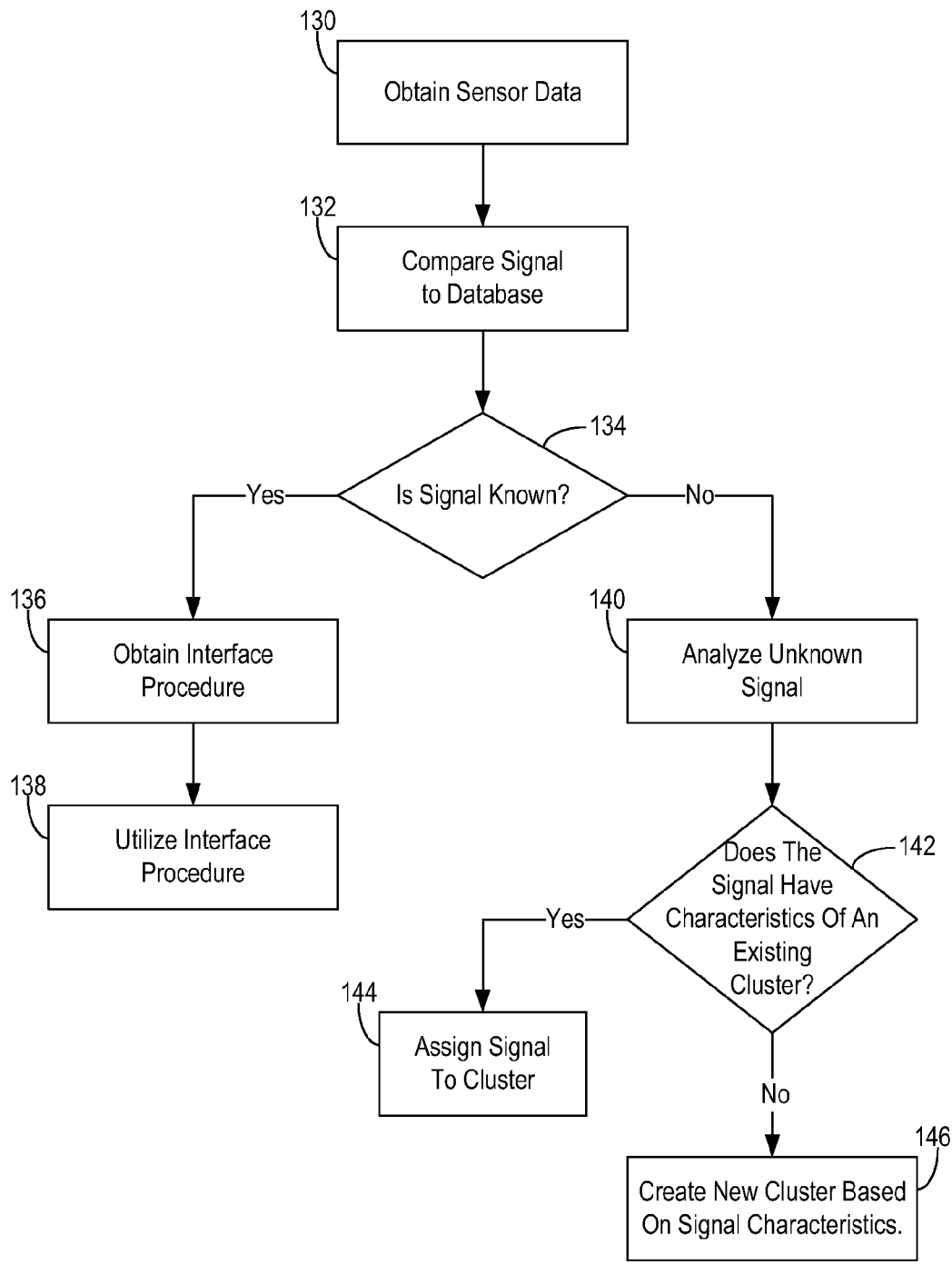
FIG. 6 is a flowchart of a classification process, according to an exemplary embodiment.

In FIG. 6, a flowchart of a classification process is shown, according to an exemplary embodiment. In an exemplary embodiment, classification engine 82 may obtain sensor data (step 130). Classification engine 82 may compare the signal to data in a database (step 132). Classification engine 82 may determine whether the signal is known or already classified (step 134). If the signal is already known or classified, then classification engine 82 may determine interface procedure(s) (step 136). Classification engine 82 may implement interface protocol(s) (step 138). If the signal is not known or classified, then classification engine 82 may analyze (e.g., mapping, shifting, clustering, etc.) unknown signal (step 140). Classification engine 82 may determine whether the signal has characteristics of an existing cluster or classification (step 142). If the signal has characteristics of an existing cluster or classification group, then classification engine 82 may assign the signal to the cluster or classification group (step 144). If the signal does not have characteristics of an existing cluster or classification group, then classification engine 82 may generate a new cluster or classification identification based on the signal's characteristics (step 146).

Figure 7:
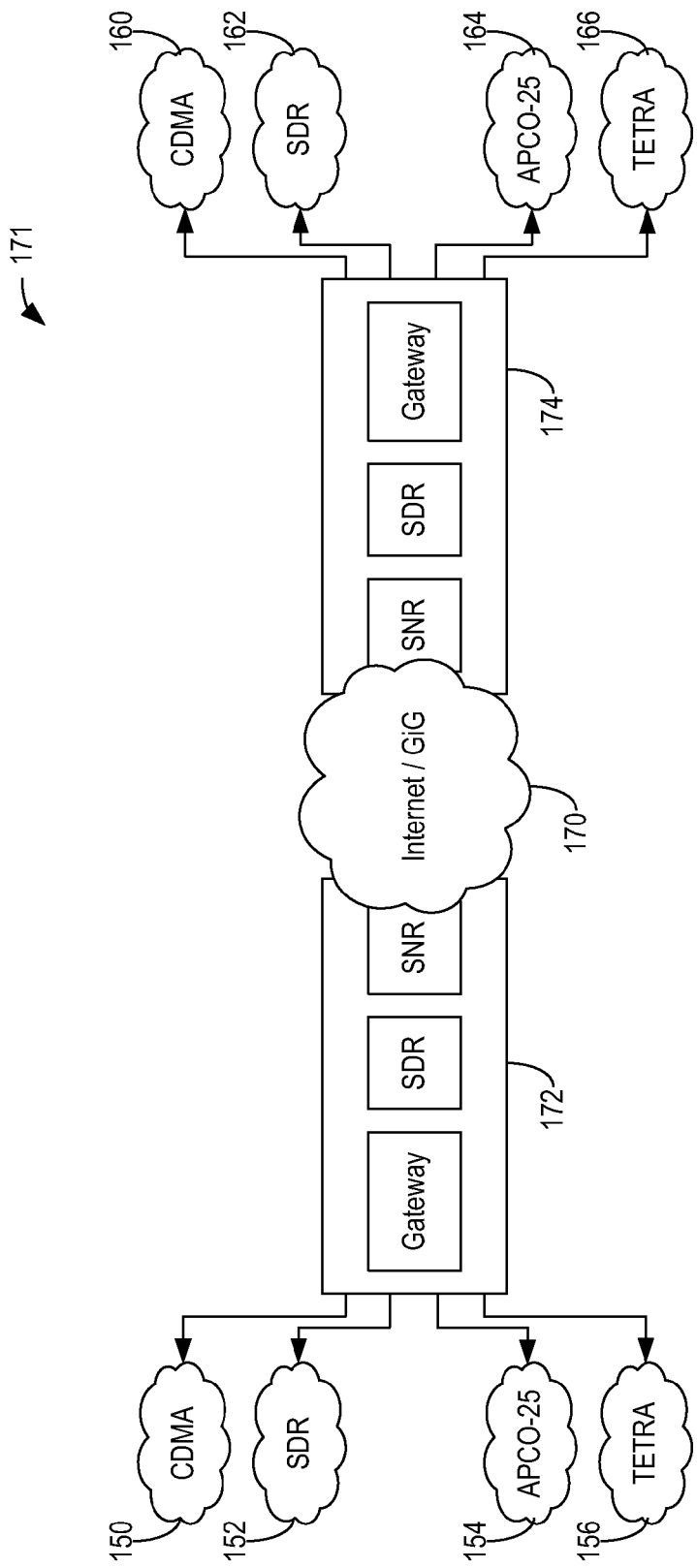
FIG. 7 is an illustration of a SNR and agnostic gateway system, according to an exemplary embodiment.

In FIG. 7, an illustration of a SNR and agnostic gateway system is shown, according to an exemplary embodiment. A network system 171 may include a first gateway system 172 and a second gateway system 174 connected via an internet 170. First gateway system 172 may include a gateway, a SDR, and a SNR. Second gateway system 174 may include a gateway, a SDR, and a SNR. First gateway system 172 may be connected to a first CDMA system 150, a first SDR system 152, a first APCO system 154, and/or a first TETRA system 156. Second gateway system 174 may be connected to a second CDMA system 160, a second SDR system 162, a second APCO system 164, and/or a second TETRA system 166. First CDMA system 150, first SDR system 152, second CDMA system 160. and second SDR system 162 may utilize waveforms for government applications. First APCO system 154, first TETRA system 156, second APCO system 164, and second TETRA system 166 may utilize waveforms for commercial applications.

In an exemplary embodiment, the system may be utilized for interoperability between dissimilar networks and range extension of first responder networks. These systems may provide coordination between various civilian and government agencies. These systems may provide coordination between various government agencies with dissimilar networks. These systems may provide communications across a large geographical area. These systems may provide waveform translation without operator intervention. These systems may provide communication support both for tactical operations and disaster recovery operations. These systems may provide communication between IP and non-IP based waveforms. These systems may support analog and digital voice. In these systems, there may be no need to modify waveforms or for crypto.

Figure 8:
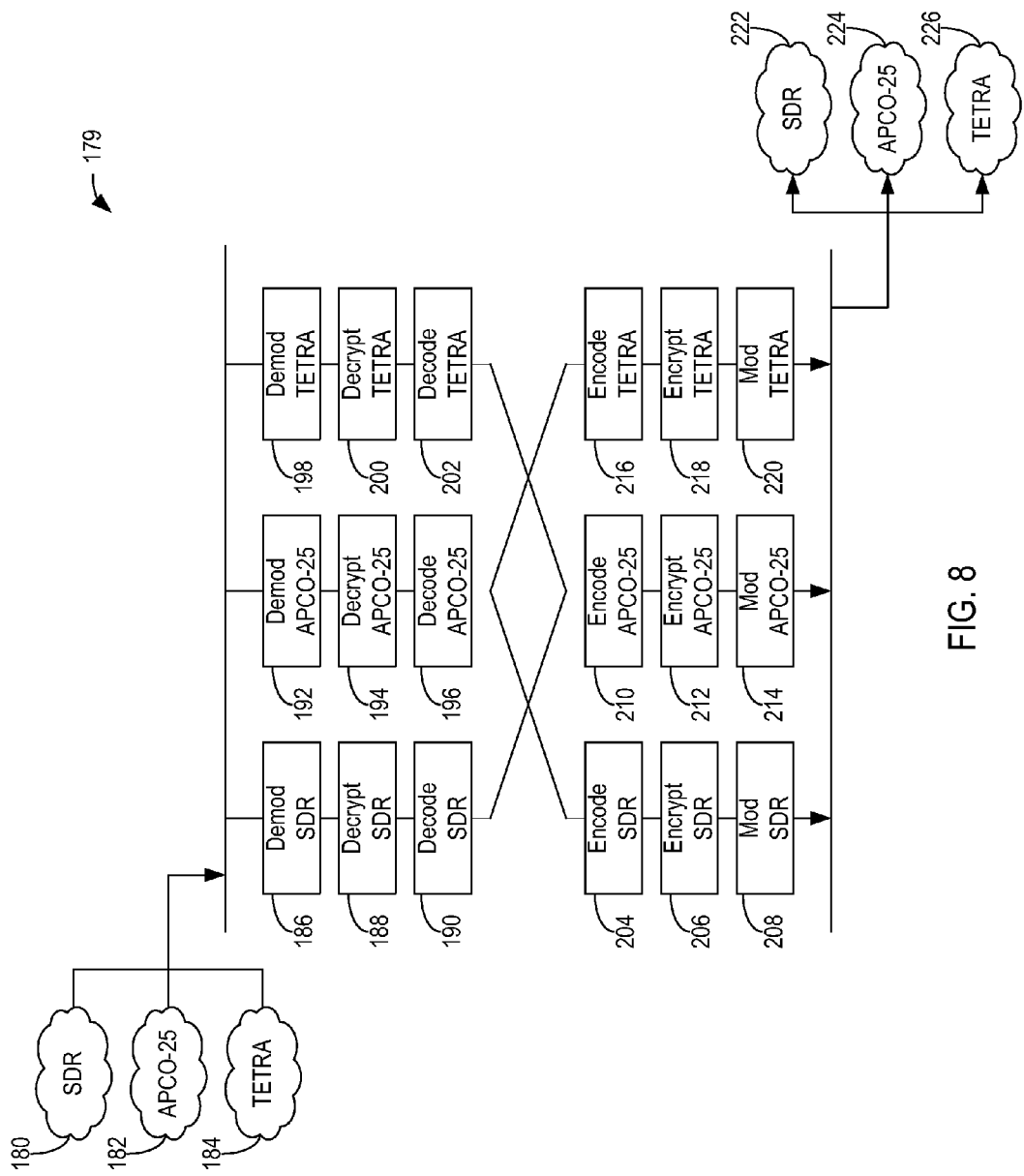
FIG. 8 is an illustration of a voice translation process, according to an exemplary embodiment.

In FIG. 8, an illustration of a voice translation process is shown, according to an exemplary embodiment. A communication gateway system 179 may include a first SDR protocol 180, a first APCO protocol 182, a first TETRA protocol 184, a second SDR protocol 222, a second APCO protocol 224, and a second TETRA protocol 226. Data from first SDR protocol 180, first APCO protocol 182, and/or first TETRA protocol 184 may be demodulated, decrypted, and decoded from one protocol and encoded, encrypted, and modulated into another protocol in communication gateway system 179 to enable communication with second SDR protocol 222, second APCO protocol 224, and/or second TETRA protocol 226. Communication system 179 may utilize a demod SDR module 186, a decrypt SDR module 188, a decode SDR module 190, an encode SDR module 204, an encrypt SDR module 206, a mod SDR module 208, a demod APCO module 192, a decrypt APCO module 194, a decode APCO module 196, an encode APCO module 210, an encrypt APCO module 212, a mod APCO module 214, a demod TETRA module 198, a decrypt TETRA module 200, a decode TETRA module 202, an encode TETRA module 216, an encrypt TETRA module 218, and a mod TETRA module 220. For example, APCO data may be converted into SDR data via demod APCO 192, decrypt APCO 194, decode APCO 196, encode SDR 204, encrypt SDR 206, and mod SDR 208. In an exemplary embodiment, SDR may support VoIP. In an exemplary embodiment, the system may encapsulate the decoded voice data.

Figure 9:
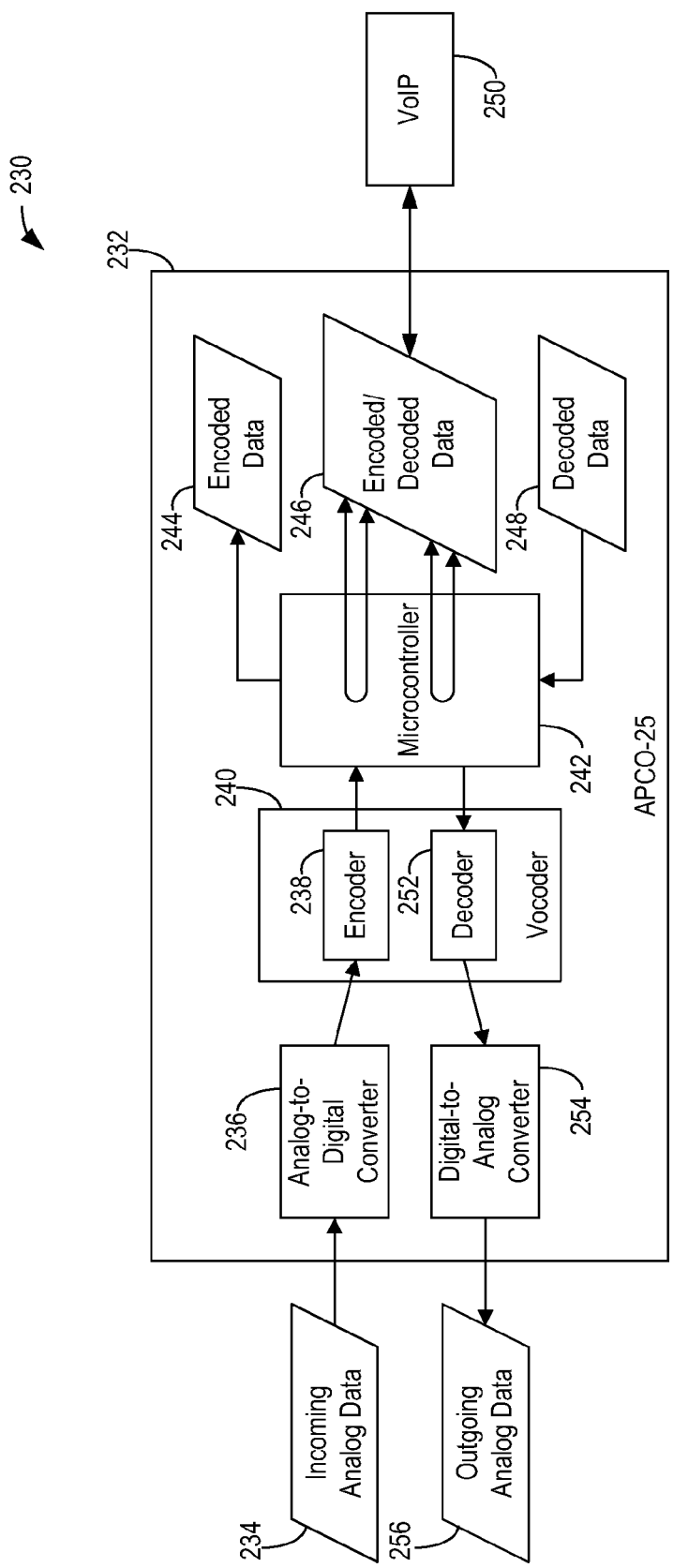
FIG. 9 is an illustration of a multi-channel software defined radio translation system, according to an exemplary embodiment.

In FIG. 9, an illustration of a SDR translation system is shown, according to an exemplary embodiment. In an exemplary embodiment, a gateway device 230 may include a converter 232. Converter 232 may include an analog-to-digital converter 236, a digital-to-analog converter 254, a vocoder 240, and a microcontroller 242. Vocoder 240 may include an encoder 238 and a decoder 252. Incoming analog data 234 may be processed by analog-to-digital converter 236 which transmits this data to vocoder 240 and then to microprocessor which may generate an encoded/decoded data 246 which is and then transmitted to a VoIP device 250. In another exemplary embodiment, VoIP device 250 transmits encoded/decoded data 246 via microcontroller 242 and vocoder 240 to digital-to-analog converter 254 which generates an outgoing analog data 256. In another exemplary embodiment, a decoded data 248 may be received by microcontroller 242. In another exemplary embodiment, an encoded data 244 may be transmitted from microcontroller 242.

In an exemplary embodiment, the universal communications gateway may assist the war fighter by allowing seamless communications between forces and allowing them to achieve better synergy and coordination. The gateway may provide the war fighter with accurate actionable intelligence and supports multiple commercial (e.g., TETRA, APCO-25 and other waveforms) and tactical waveforms (e.g., WNW, Link-16, VHF AM/FM, SINCGARS and other waveforms). This technology may be extended to support many other waveforms. Gateway may utilize cognitive and software defined radio technologies to provide a gateway solution that is optimized for SWAP-C and may be used both with commercial and tactical waveforms. In another embodiment, gateway may assist the war fighter by providing translations between multiple waveforms that are used in tactical environment. Multiple waveforms may be used by different countries when they are fighting enemy forces. Gateway may bridge the communication gaps among the coalition war fighters by identifying and classifying the friendly and foe communications waveforms and providing fast translations among the friendly waveforms. This may provide enough time and opportunity for the coalition forces to coordinate among themselves and face any threat by using the actionable intelligence. A high speed radio frequency scanner may scan the spectrum for any energy to identify known and unknown communication signals. These signals may be classified using a classifier engine to provide actionable intelligence. Identification of friendly waveforms may trigger the SDR to employ the correct waveform to receive the voice, video and data traffic and a rule-based semantic parser to provide translations to transmitted/received communications over any desired waveform.

Classification engine 82 may be a statistical Gaussian Mixture Model and Bayesian decision maker based signal classifier. Traditional classifiers use the modulation to identify and classify the radio frequency signals which produces significant false positives and needs significant analysis after the signal is classified to produce actionable intelligence. Classification engine 82 may work in conjunction with an adaptive threshold based constant false alarm radiometric signal detector to further reduce false positives allowing for a fully autonomous signal detection solution. This may enable the gateway to work with any known and unknown waveforms that are supported by any software defined radio.

Gateway may use a sensor to identify the radio frequency signal with the help of classification engine 82. Once the waveform is positively identified, a software module employs the waveform on SDR to provide a universal communication gateway with minimal SWAP-C. In exemplary embodiments, the waveforms may be FM3TR and DVB-T in providing full translation.

The gateway may include a radio frequency scanner which may scan the radio frequency spectrum, provide I and Q data (which is a translation of amplitude and phase data (of the radio frequency signal) from a polar coordinate system to a Cartesian (X, Y) coordinate system) to classification engine 82, and classify radio frequency signals to known waveforms. Gateway may include classification engine 82 which scans the radio frequency spectrum to identify and classify communication and radar signals using I and Q data received from the radio frequency scanner. Gateway may include component translator which provides automatic waveform translation between any two waveforms. The classification engine and component translator may be integrated with the sensor. The sensor may convert the radio frequency waveform to digital data, may perform a Fast Fourier Transform ("FFT") on the digital data to determine center frequency and bandwidth, and may utilize Ethernet for data transfer to an external device. The sensor may be a high-speed, low-power, broadband spectrum power sensor technology for dynamic spectral sensing and signal classification. The sensor may be capable of scanning various frequencies to identify and classify different waveforms.

In an exemplary embodiment, a classification module may include a classification circuit which may determine a classification of a signal based on comparing signal data received via a sensor to data in a database. In another exemplary embodiment, the classification circuit may determine an interface protocol based on the classification. In another exemplary embodiment, the classification circuit may implement the interface protocol. In another exemplary embodiment, the classification circuit may generate a new classification identification in the database based on a determination that the signal data is not within the database. In another exemplary embodiment, the classification circuit may determine that a signal source represents a threat. In another exemplary embodiment, the classification circuit may generate a message relating to the threat and to transmit the message to an outside source. In another exemplary embodiment, the classification circuit may transmit a jamming signal via a jamming engine. In another exemplary embodiment, a method of communicating may include receiving signal data and comparing the signal data to data in a database. In another exemplary embodiment, the method may further include determining a classification of a signal based on a comparison of the signal data to data in the database and/or determining an interface protocol based on the classification. The method may also include communicating between a first communication device and a second communication device utilizing the interface protocol. In another exemplary embodiment, the method may further include generating a new classification identification in the database based on a determination that the signal data is not within the database. The method may also include determining that a signal source represents a threat based on the signal data. In another exemplary embodiment, the method may include generating a message relating to the threat. The method may also include transmitting a jamming signal to the signal source. The method may also include receiving a second signal data and comparing the second signal data to data in a database. The method may also include determining a second classification of a second signal based on a comparison of the second signal data to data in the database and/or determining a second interface protocol based on the second classification. The method may also include communicating between a first communication device, a second communication device, and a third communication device utilizing the interface protocol and the second interface protocol.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. The disclosure may be utilized in a non-transitory media. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A classification module comprising:
 a classification circuit configured to determine a classification of an RF signal based on comparing signal data received via a sensor to data in a database, wherein the classification circuit uses statistical features associated with the RF signal to determine the classification, wherein the signal data is provided using spectral analysis for determining modulation type, center frequency, and bandwidth without using demodulating signal recognition;
 the classification circuit being configured to determine an interface protocol based on the classification.

2. The classification module of claim 1, wherein the statistical features are clustered and the classification circuit uses cluster data to determine the classification.

3. The classification module of claim 1, wherein the classification circuit being further configured to generate a new classification identification in the database based on a determination that the signal data is not within the database.

4. The classification module of claim 1, wherein the classification circuit being further configured to determine that a signal source represents a threat.

5. The classification module of claim 4, wherein the classification circuit being further configured to generate a message relating to the threat, transmit the message to an outside source, and transmit a jamming signal via a jamming engine.

6. A method of communicating, comprising:
receiving signal data, the signal data being statistical measures associated with the spectrum of an RF signal, wherein the signal data is provided using spectral analysis for determining modulation type, center frequency, and bandwidth without using demodulating signal recognition;
comparing the signal data to data in a database;
determining a classification of the RF signal based on a comparison of the signal data to the data in the database; and
determining an interface protocol based on the classification.

7. The method of claim 6, further comprising communicating between a first communication device and a second communication device utilizing the interface protocol.

8. The method of claim 6, further comprising generating a new classification identification in the database based on a determination that the signal data is not within the database.

9. The method of claim 6, further comprising determining that a signal source represents a threat based on the signal data.

10. The method of claim 9, further comprising generating a message relating to the threat and transmitting a jamming signal to the signal source.

11. The method of claim 6, further comprising:
receiving a second signal data;
comparing the second signal data to data in a database;
determining a second classification of a second signal based on a comparison of the second signal data to data in the database; and
determining a second interface protocol based on the second classification.

12. The method of claim 11, further comprising communicating between a first communication device, a second communication device, and a third communication device utilizing the first interface protocol and the second interface protocol.

13. A classification module comprising:
an input for receiving signal data, the signal data comprising cluster data; and
an electrical processor for comparing the signal data to data in a database,
the electrical processor determining a classification of a signal based on a comparison of the cluster data to the data in the database, the cluster data being in a window, wherein the signal data is provided using spectral analysis for determining modulation type, center frequency, and bandwidth without using demodulating signal recognition, the electrical processor also
determining an interface protocol based on the classification.

14. The classification module of claim 13, wherein the electrical processor communicates between a first communication device and a second communication device utilizing the interface protocol.

15. The classification module of claim 13, wherein the electrical processor generates a new classification identification in the database based on a determination that the signal data is not within the database.

16. The classification module of claim 13, wherein the electrical processor determines that a signal source represents a threat based on the signal data.

17. The classification module of claim 16, wherein the electrical processor generates a message relating to the threat and transmits a jamming signal to the signal source.

18. The classification module of claim 1, wherein the classification circuit comprises at least one of a statistical Gaussian mixture model and Bayesian mixture model for classifying a signal.

19. The method of claim 6 wherein target waveforms may be triggered on a multi-channel Software Define Radio, the target waveforms also being able to be triggered on different channels of the same Software Define Radio or a separate Software Define Radio.

20. The method claim 6 further comprising receiving a waveform that does not match any known waveform, utilizing band shifting to map the wave form to find a signal pattern resulting in a shifted waveform, and assigning the waveform to an existing class identification based on the shifted waveform.

* * * * *